(No Model.)
J. J. GROSHANS.
ELECTRICAL CONDUIT.
No. 582,910. Patented May 18, 1897.
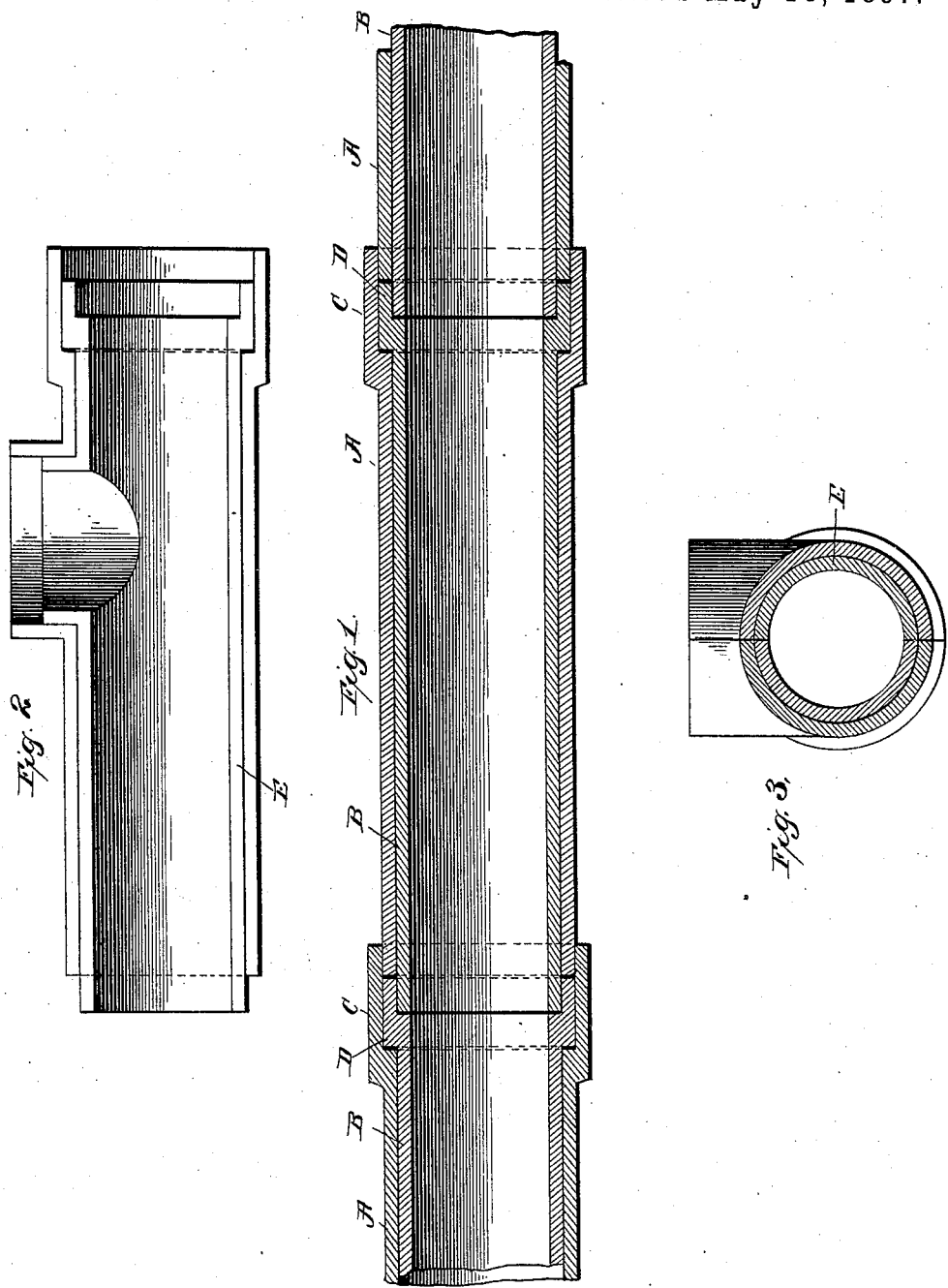
Witnesses
E. C. Wurdeman
S. Williamson
Inventor
Jacob J. Groshans
by Geo. H. Holgate
Attorney

UNITED STATES PATENT OFFICE.

JACOB J. GROSHANS, OF BUFFALO, NEW YORK.

ELECTRICAL CONDUIT.

SPECIFICATION forming part of Letters Patent No. 582,910, dated May 18, 1897.

Application filed December 5, 1896. Serial No. 614,603. (No model.)

*To all whom it may concern:*

Be it known that I, JACOB J. GROSHANS, a citizen of the United States, residing at Buffalo, in the county of Erie and State of New York, have invented a certain new and useful Improvement in Electrical Conduits, of which the following is a full, clear, and exact specification.

My invention relates to a new and useful improvement in non-conducting moisture-proof conduits for electric wires and cables, and has for its object to provide a conduit of this description composed of sections or lengths which when properly joined together will be absolutely non-conducting with reference to electricity and which will exclude all moisture from the interior thereof, thereby protecting the wires or cables contained within the conduit from the injurious action of moisture as well as preventing the escape of any portion of the electric current transmitting over said wires or cables.

With these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1 is a section of a conduit constructed in accordance with my improvement; Fig. 2, an end view of a split section utilized in replacing a section which has been removed from the conduit; and Fig. 3, a side elevation of a section of the conduit utilized as a manhole through which the wires or cables may be inserted.

In carrying out my invention as here embodied I provide a series of exterior pipes A of such size as to receive the interior pipes B. These pipes, both the exterior and interior, are composed of salt-glazed fire-clay, having at one end an enlargement C and D, respectively, which serves as a coupling for the reception of the opposite ends of the pipe, and when being utilized for the construction of a conduit the pipes or sections B are passed within the outer sections A, so that the coupling of the smaller pipe feeds within the coupling of the larger pipe, and a certain length of the inner pipe protrudes beyond the end of the outer pipe. Now a coating of tar is given to the protruding end of the inner pipe, while a coating of Portland cement is applied to the small end of the outer pipe, after which another pipe B has its coupling end fitted over the protruding end of the first inner pipe, and finally another pipe A is passed over the last-applied smaller pipe so that its coupling end surrounds the joint made by the smaller pipes and also passes over the end of the first-named outer pipe. This, as shown in Fig. 1, produces a double conduit, the inner portion of which is joined together and sealed by tar, while the sections of the outer portions are joined together and sealed by Portland cement. The result of this is that wires or cables laid within said conduit will be absolutely protected from the moisture of the ground in which the conduit is laid, and any electric current passing over the wires or cables will also be prevented from escape by reason of the fact that the composition of the sections of the conduit is electrically non-conducting.

The usual manholes at street-crossings or other convenient points are produced by providing an inner section E of T form and inclosing the same in an outer section which is split, the inner section being also split or made in two parts, as clearly shown in Figs. 2 and 3, and this manhole may be closed by any suitable trap, so that after a cable or wire has been passed within the conduit this hole may be sealed, thus preventing the ingress of moisture or moist air.

It sometimes becomes necessary to remove a section of the conduit for adding thereto a branch line or for repairs or other purposes, and when this has been done by breaking away the desired section it is obvious that means must be provided for replacing the section without disturbing the remainder of the conduit, and this I accomplish by making an outer and inner section of the conduit in halves or split, as shown in Figs. 2 and 3, and when placing them in position to complete the conduit which has been broken the halves of the inner section are placed in position and sealed by the application of tar at the meeting edges and may also be coated with tar, so as to further insure the perfect sealing thereof, after which the two halves of the outer section are placed in position and sealed where coming in contact with the two ends of the broken conduit by Portland cement, as well as along the lines where the halves come together.

When occasion requires, the sections of the conduit, both the inner and outer, may be provided with sockets or couplings at each end, and such sections may be either utilized for the carrying upward of a manhole or for the turning of corners or branch conduits, as will be readily understood.

I do not wish to be limited to the exact material from which the sections of the conduit are made, as this may be of any suitable material having the power to resist the permeation of moisture or the escape of electric currents.

Having thus fully described my invention, what I claim as new and useful is—

1. A conduit consisting of two series of pipes one within the other, one series being sealed by a material impervious to moisture and the other series by a non-conductive material, substantially as described.

2. A conduit, composed of a series of pipes coupled together and sealed at their joints by tar, and a series of pipes inclosing the first-named pipes, the last-named pipes being sealed at their joints by Portland cement, as specified.

3. In combination with a conduit of the character described, a section adapted to be inserted therein after the conduit is laid, said section consisting of an inner pipe composed of halves divided longitudinally, and an outer pipe also composed of halves divided longitudinally and adapted to inclose the inner pipe and be sealed against the ingress of moisture, as specified.

4. In combination with a conduit of the character described, a section for use in connection with said conduit, consisting of an inner tube having a T branch leading therefrom, and an outer pipe formed in halves which are divided longitudinally, said outer pipe also having formed therewith a T branch, whereby a manhole is introduced in the conduit, substantially as and for the purpose set forth.

5. A conduit, composed of an inner pipe made up of sections of salt-glazed fire-clay, and an outer pipe also composed of sections formed of a similar material, the inner sections being joined together by an application of tar, while the outer sections being joined together by an application of cement, substantially as and for the purpose set forth.

6. In a conduit, two series of pipes one adapted to fit within the other, enlarged mouths formed at one end of the pipes, the outer pipes projecting beyond the inner pipes at the large end and the inner pipes projecting beyond the outer pipes at the other end, one series being by a material impervious to moisture and the other series by a non-conductive material, substantially as and for the purpose described.

In testimony whereof I have hereunto affixed my signature in the presence of two subscribing witnesses.

JACOB J. GROSHANS.

Witnesses:
S. S. WILLIAMSON,
WM. J. BARTHOLOMY.